US005582078A

United States Patent [19]
Talley

[11] Patent Number: 5,582,078
[45] Date of Patent: Dec. 10, 1996

[54] WIRE DISPLACING AND STRIPPING APPARATUS AND METHOD

[75] Inventor: Lloyd A. Talley, Valinda, Calif.

[73] Assignee: Eubanks Engineering Company, Monrovia, Calif.

[21] Appl. No.: 193,548

[22] Filed: Feb. 8, 1994

Related U.S. Application Data

[63] Continuation of Ser. No. 884,928, May 18, 1992, abandoned.

[51] Int. Cl.6 ........................................... H02G 1/12
[52] U.S. Cl. ................................. 81/9.51; 81/9.42
[58] Field of Search ........................ 81/9.51, 9.4, 9.41, 81/9.42, 9.43, 9.44

[56] References Cited

U.S. PATENT DOCUMENTS

| | | |
|---|---|---|
| 1,433,320 | 10/1922 | Wersel . |
| 1,477,678 | 12/1923 | Wetmore . |
| 1,866,095 | 7/1932 | Foley . |
| 2,401,149 | 5/1946 | Gordon . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 3/1959 | Harris . |
| 2,915,928 | 12/1959 | Felts et al. . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,376,627 | 4/1968 | Sitz . |
| 3,479,718 | 11/1969 | Van De Kerkhof et al. . |
| 3,552,449 | 1/1971 | Woodward . |
| 3,570,100 | 3/1971 | Kindell et al. . |
| 3,604,291 | 9/1971 | Weidner . |
| 3,612,111 | 10/1971 | Meyer . |

(List continued on next page.)

FOREIGN PATENT DOCUMENTS

| | | |
|---|---|---|
| 234929 | 2/1987 | European Pat. Off. . |
| 2513478 | 9/1981 | France . |
| 2525403 | 4/1982 | France . |
| 2525402 | 4/1982 | France . |
| 1084799 | 7/1960 | Germany . |
| 2927235 | 8/1980 | Germany . |
| 3926782 | 12/1990 | Germany . |
| 1216815 | 3/1986 | U.S.S.R. . |
| 1293779 | 2/1987 | U.S.S.R. . |
| 609834 | 4/1948 | United Kingdom . |
| 1289936 | 4/1971 | United Kingdom . |

OTHER PUBLICATIONS

*Standard Logic* Catalog, "EWS–6K Electronic Wire Stripper", Feb. 1974.
*Artos* Catalog Sheet, "Single Blade, Fully Automatic Wire Processing" 1989.
Komax 33 Catalogue Sheet, 1988.

Primary Examiner—D. S. Meislin
Attorney, Agent, or Firm—William W. Haefliger

[57] ABSTRACT

An apparatus for stripping sheathing from longitudinally axially extending wire at controllable depth comprising a frame; a carriage on the frame linearly movable longitudinally,; wire clamp structure on the carriage for sidewardly clamping the wire sheathing, at a location spaced from the end of the wire advanced past the clamp structure, the clamp structure movable longitudinally by the carriage; a rotating spindle on the frame and blade structure on the spindle and rotatable thereby to rotatably cut into the wire sheathing, the blade structure having cutting edges; structure to control the depth of cutting of the blade structure into the sheathing, and as the spindle rotates; and first drive structure operatively connected with the carriage to carry the wire to longitudinally selected positions at which the blade structure then cuts into the sheathing to controlled depth, the carriage being retractable so that a cut plug of the sheathing is pulled endwise off the wire.

26 Claims, 10 Drawing Sheets

5,582,078
Page 2

U.S. PATENT DOCUMENTS

| | | |
|---|---|---|
| 3,614,905 | 10/1971 | Bieganski . |
| 3,645,156 | 2/1972 | Meyer et al. . |
| 3,653,412 | 4/1972 | Gudmestad . |
| 3,701,301 | 10/1972 | Gudmestad . |
| 3,769,681 | 11/1973 | Eubanks . |
| 3,795,159 | 3/1974 | Steiner et al. . |
| 3,838,612 | 10/1974 | Inami . |
| 3,857,306 | 12/1974 | Gudmestad . |
| 3,857,313 | 12/1974 | Endo . |
| 3,869,781 | 3/1975 | Eubanks et al. . |
| 3,872,584 | 3/1975 | Chick et al. . |
| 3,881,374 | 5/1975 | Gudmestad . |
| 3,918,330 | 11/1975 | Blaha . |
| 3,921,472 | 11/1975 | Gudmestad et al. . |
| 3,927,590 | 12/1975 | Gudmestad et al. . |
| 3,951,016 | 4/1976 | Gudmestad et al. . |
| 4,009,738 | 3/1977 | Baba et al. . |
| 4,027,557 | 6/1977 | Stepan . |
| 4,091,695 | 5/1978 | Funcik et al. . |
| 4,112,791 | 9/1978 | Wiener . |
| 4,156,961 | 6/1979 | Agoh . |
| 4,164,808 | 8/1979 | Gudmestad et al. . |
| 4,165,768 | 8/1979 | Gudmestad . |
| 4,166,315 | 9/1979 | Gudmestad et al. . |
| 4,175,316 | 11/1979 | Gudmestad . |
| 4,194,281 | 3/1980 | Gudmestad . |
| 4,238,981 | 12/1980 | Karl . |
| 4,244,101 | 1/1981 | Talley . |
| 4,250,772 | 2/1981 | Graber . |
| 4,261,230 | 4/1981 | Sindelar . |
| 4,266,455 | 5/1981 | Ago . |
| 4,275,619 | 6/1981 | Shimizu .................................. 81/9.51 |
| 4,327,609 | 5/1982 | Resch . |
| 4,350,061 | 9/1982 | Isham et al. . |
| 4,364,289 | 12/1982 | Sorensen . |
| 4,370,786 | 2/1983 | Butler . |
| 4,403,383 | 9/1983 | Dewhurst et al. . |
| 4,428,114 | 1/1984 | Teagno . |
| 4,446,615 | 5/1984 | Talley . |
| 4,493,233 | 1/1985 | Dusel et al. . |
| 4,502,586 | 3/1985 | Dusel et al. . |
| 4,521,946 | 6/1985 | Dusel et al. . |
| 4,543,717 | 10/1985 | Luka . |
| 4,581,796 | 4/1986 | Fukuda et al. . |
| 4,584,912 | 4/1986 | Gudmestad et al. . |
| 4,597,179 | 7/1986 | Goforth . |
| 4,601,093 | 7/1986 | Cope . |
| 4,631,822 | 12/1986 | Reinertz . |
| 4,638,558 | 1/1987 | Eaton . |
| 4,713,880 | 12/1987 | Dusel et al. . |
| 4,738,019 | 4/1988 | Kawaguchi . |
| 4,745,828 | 5/1988 | Stepan . |
| 4,802,512 | 2/1989 | Kodera . |
| 4,827,592 | 5/1989 | Kodera . |
| 4,833,778 | 5/1989 | Loustau . |
| 4,838,129 | 6/1989 | Cope . |
| 4,852,433 | 8/1989 | Butler . |
| 4,869,135 | 9/1989 | Hoffa . |
| 4,942,789 | 7/1990 | Hoffa et al. . |
| 5,010,797 | 4/1991 | Stepan . |
| 5,067,379 | 11/1991 | Butler et al. . |
| 5,142,950 | 9/1992 | Takano et al. . |

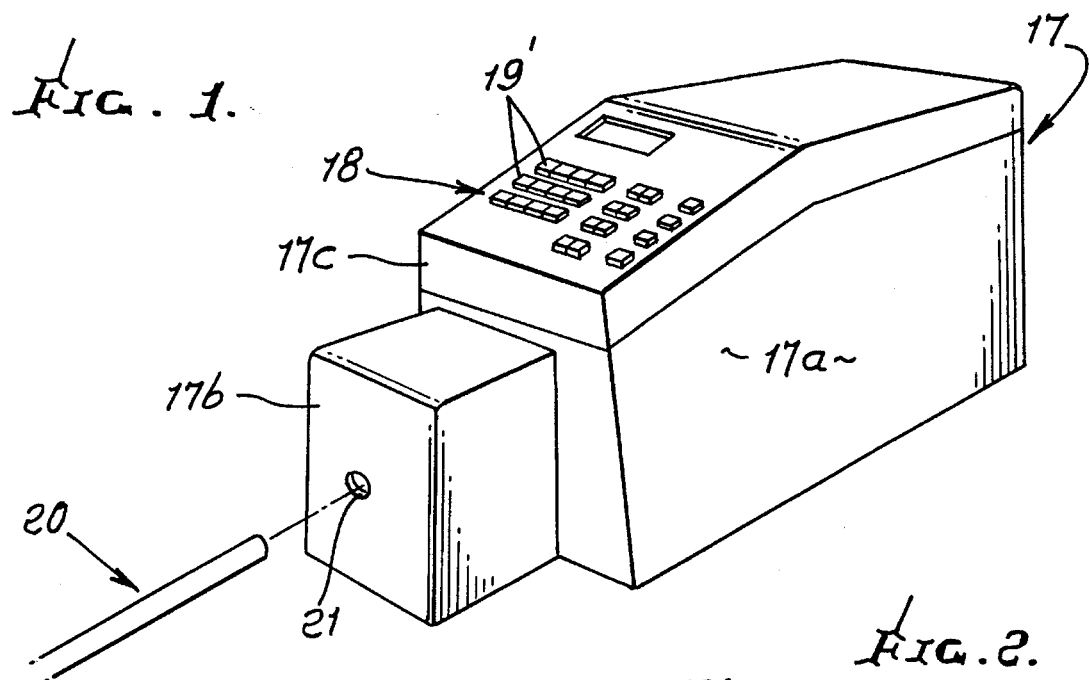
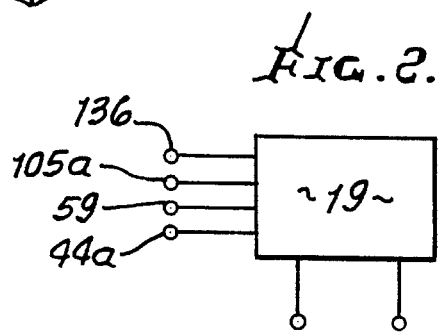
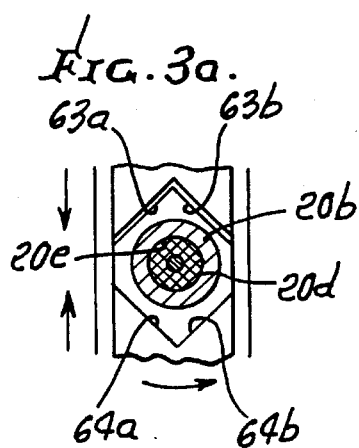
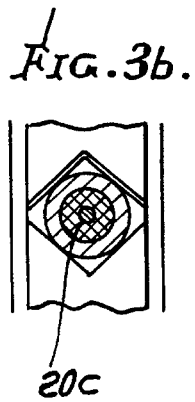
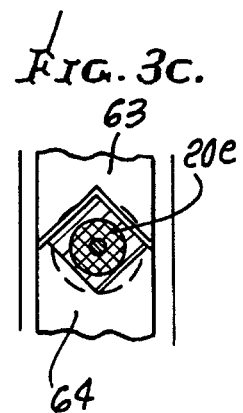
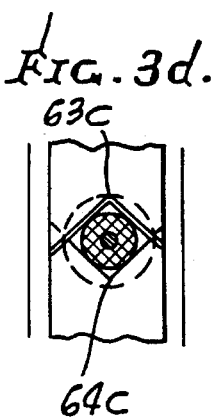

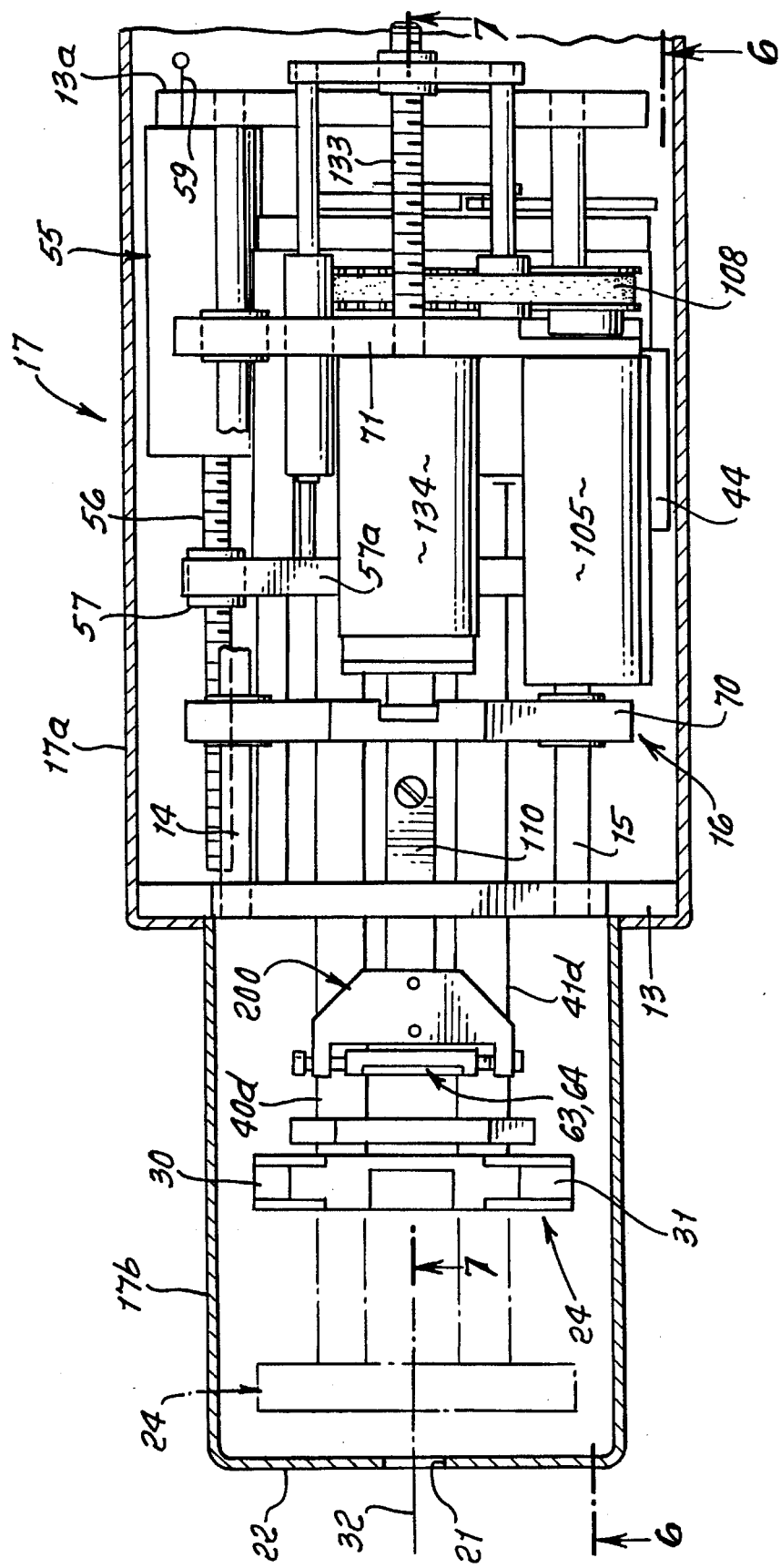

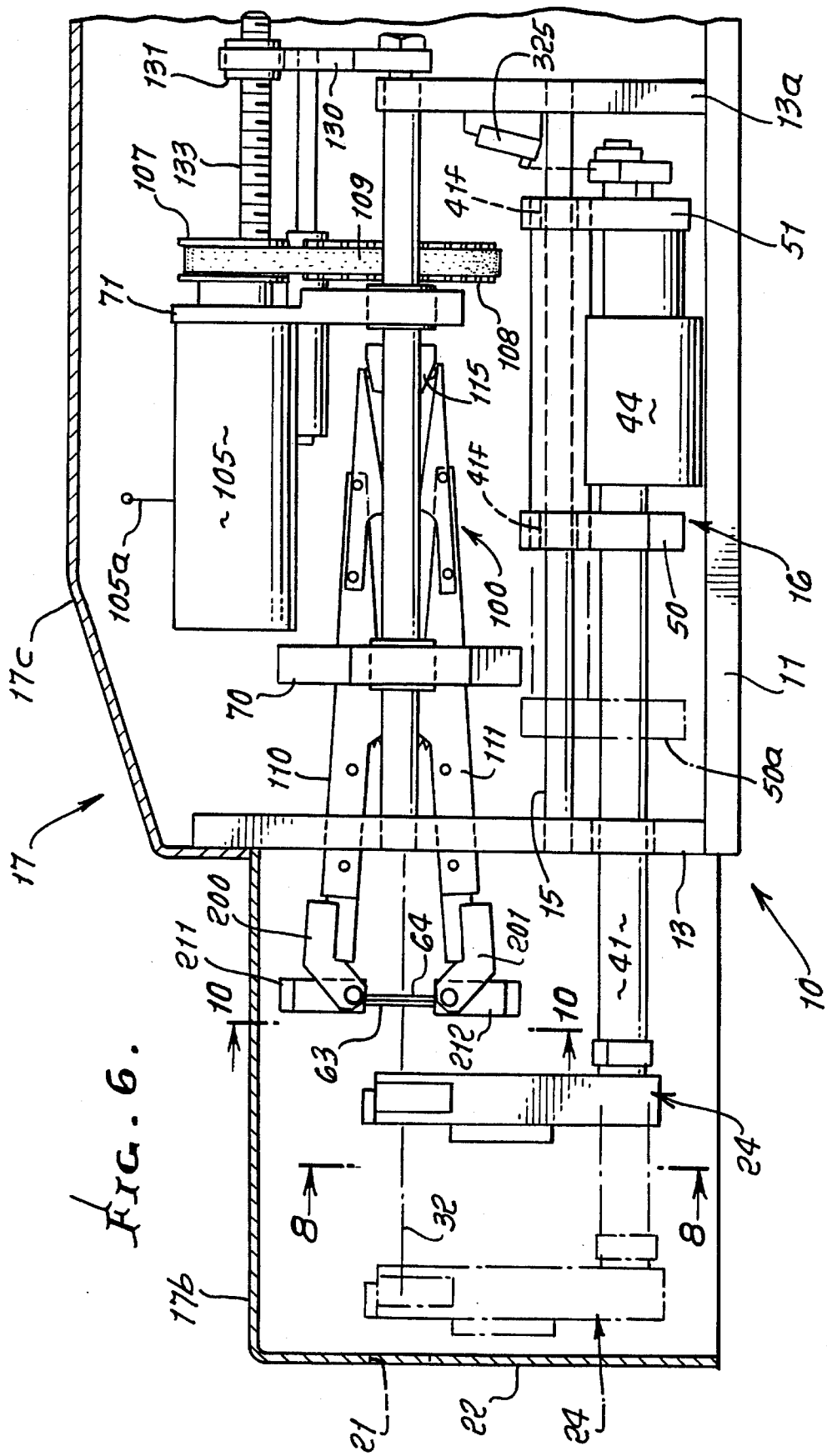

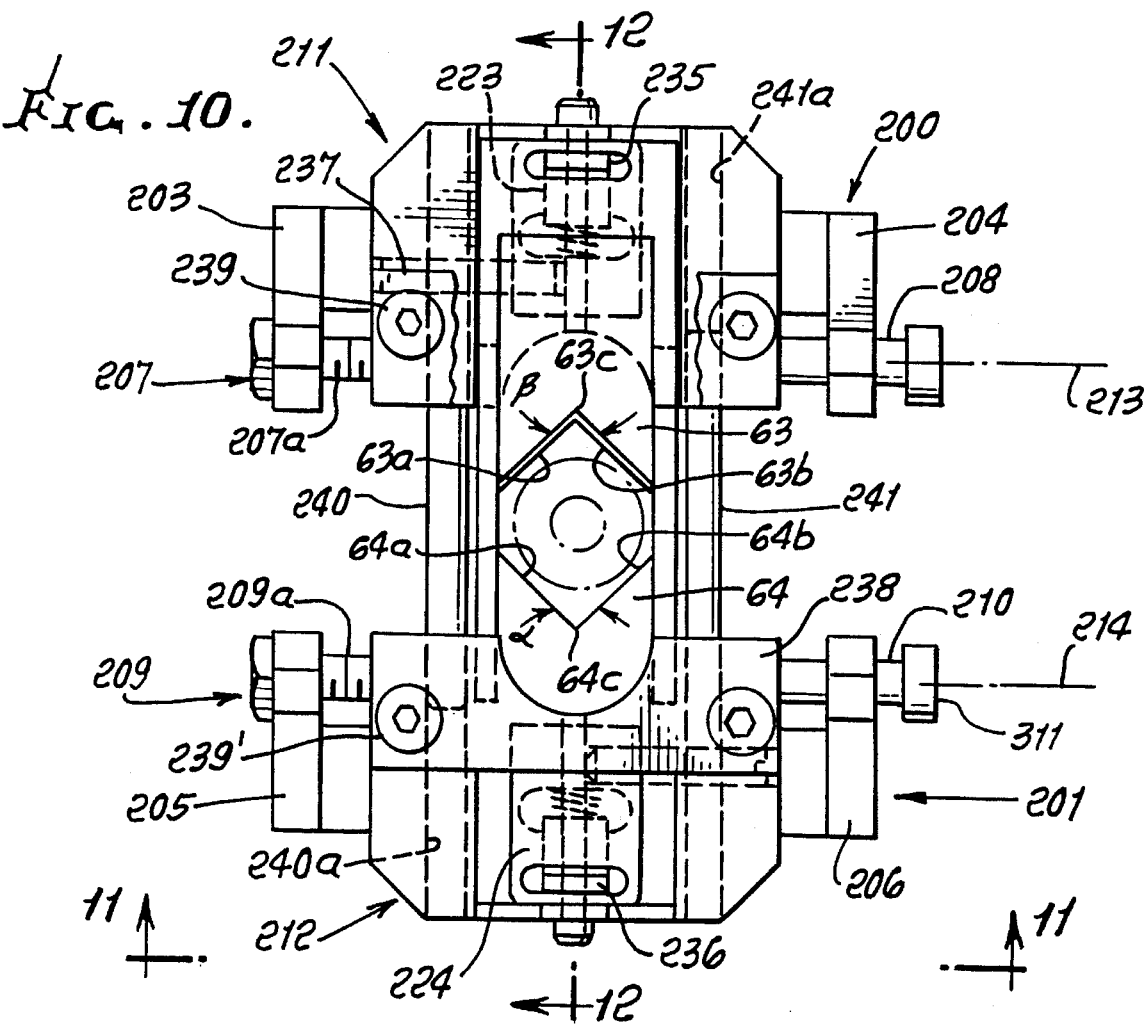
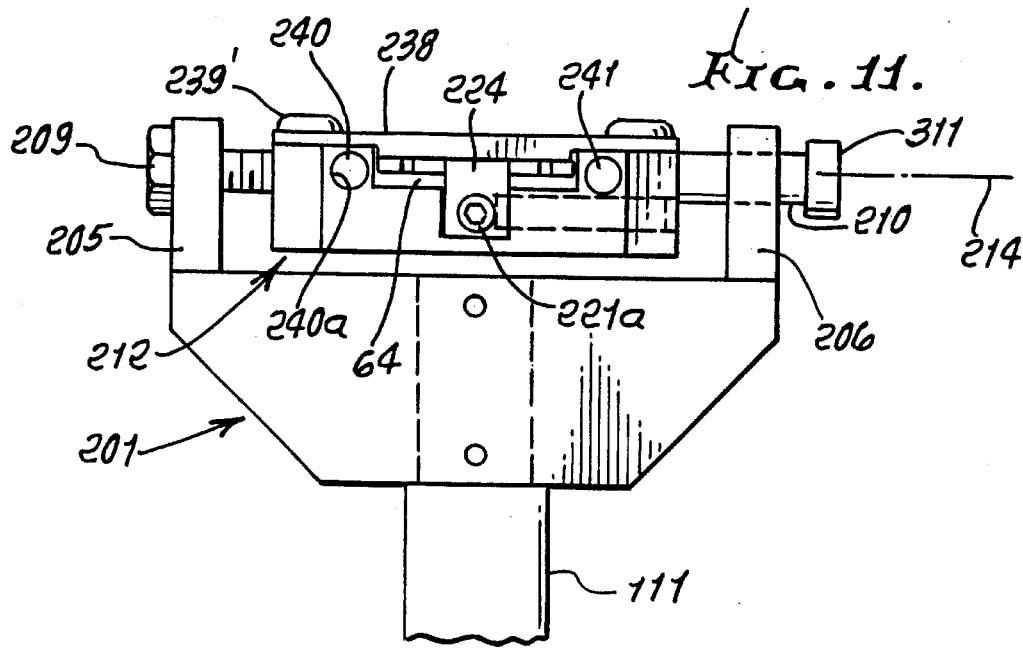

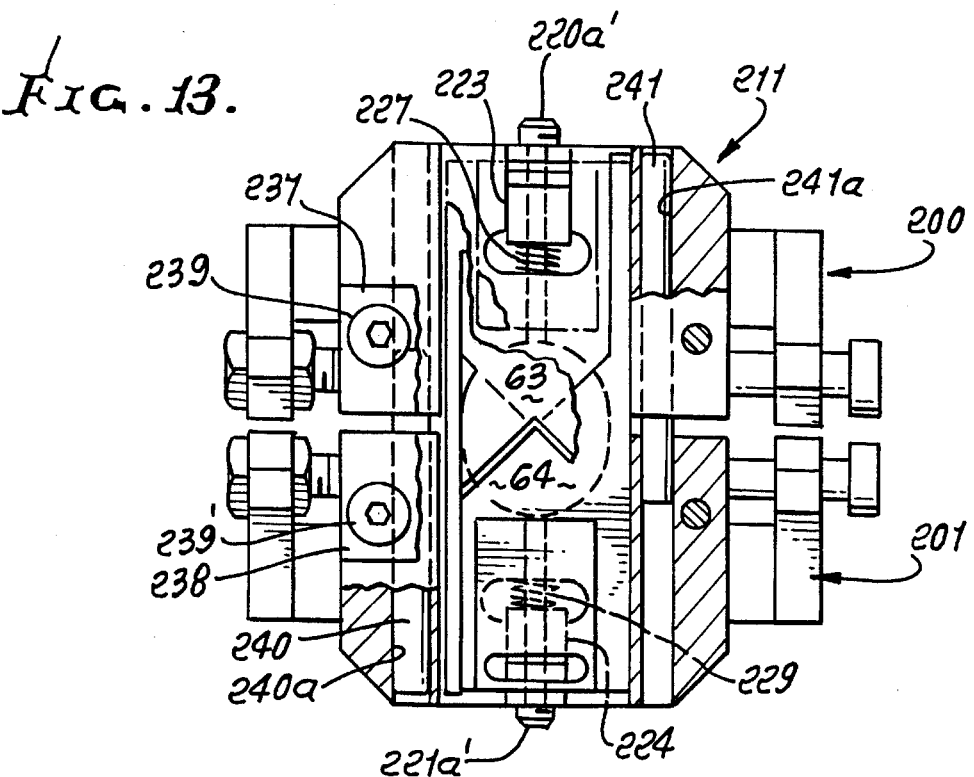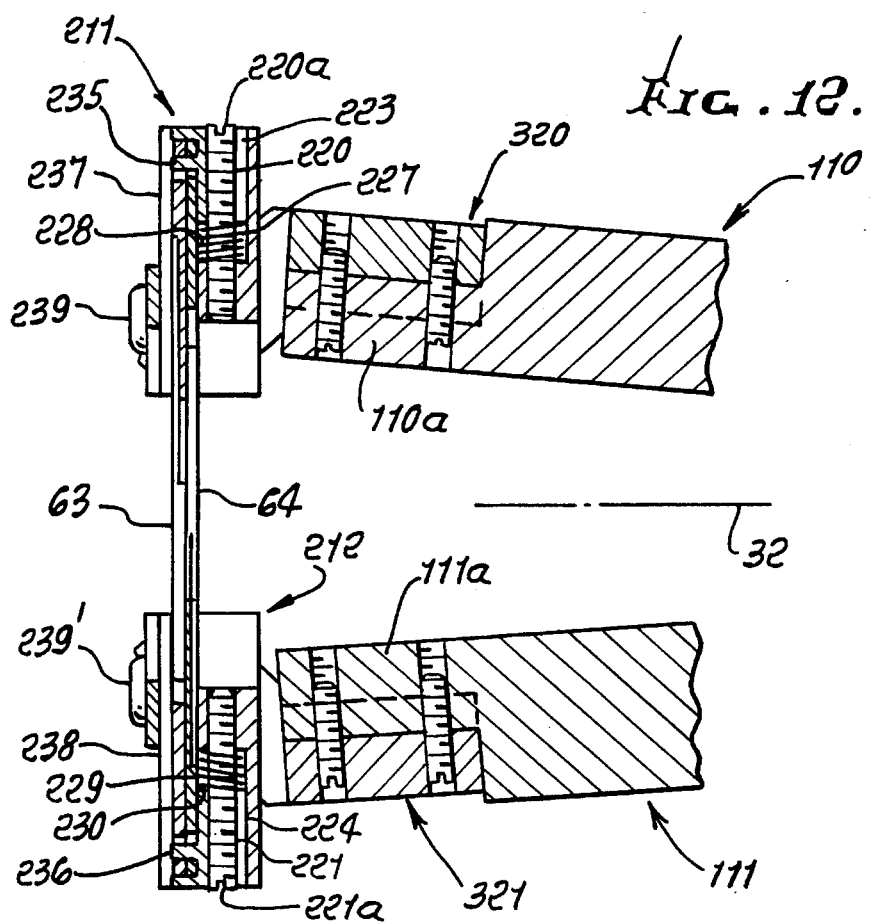

5,582,078

WIRE DISPLACING AND STRIPPING APPARATUS AND METHOD

This is a continuation of application Ser. No. 07/884,928, filed May 18, 1992, now abandoned.

BACKGROUND OF THE INVENTION

This invention relates generally to the stripping of sheathing or insulation off wire or cable cores, at wire or cable ends; and more specifically it concerns compact, automatically operable apparatus for controllably effecting the wire end stripping function, as well as being operable with respect to wires and cables of different sizes.

Manual, or manually controlled, tool stripping of wire ends is time consuming and inaccurate, and commonly results in damage to the wire core. The problem becomes acute as the diameter of the wire decreases, as extremely fine insulated wire is difficult to handle, as by gripping and the thickness of the insulation becomes so small that damage to the core by gripping and/or stripping tools becomes almost unavoidable. For example, gripping clamps subject to arc-travel gripping movement by axially movable conical devices can create wire control and handling problems, including insufficient gripping and inaccurate centering of the wire, and interference with means to effect blade movement toward the insulation.

There is need for accurate, reliable, rugged, and compact stripping apparatus that is capable of rapidly and accurately stripping insulation off wire ends of different diameters and sizes, without damage to the wire cores, as well as positive and accurate gripping and centering of the wire being stripped.

SUMMARY OF THE INVENTION

It is a major object of the invention to provide apparatus and method meeting the above need.

Basically, the apparatus of the invention comprises, in combination:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having V-shaped cutting edges, e) means to control the depth of cutting of the blade means into the sheathing, and as the spindle rotates, f) and first drive means operatively connected with the carriage to carry the wire to longitudinally selected positions at which the blade means then cuts into the sheathing to controlled depth, the carriage being retractable so that a cut plug of the sheathing is pulled endwise off the wire.

It is another object of the invention to provide the means for controlling the depth of cutting of the blade means to include pivoted arm means, an actuator for controllably pivoting the arm means, the blade means carried by the arm means, the arm means, spindle, and actuator carried by the frame.

It is yet another object of the invention to provide clamp means in the form of two clamp elements, and including a drive operatively connected with the elements to move them linearly toward and away from one another. Such clamp elements may advantageously comprise two heads having parallel intermeshing plates defining opposed V-shaped jaws movable relatively toward one another to increasingly enclose and clamp the wire.

It is another object to provide arm means in the form of two pivoted arms, two blades, and blade carriers for the respective blades, the carriers pivotally supported by the two arms, facilitating accurate movement of the blades toward and away from the wire, the pivoting of the two arms remaining at a fixed axial position. Such carrier pivoting may be effected by yoke support of the carriers.

A further object includes the provision of the two blades with V-shaped cutting edges defining an apex, the apices of the two blades being in lateral alignment as the blades are moved oppositely toward the wire. Blade leads are typically carried by the two arms to lead the blades during their movement toward the wire.

Yet another object is to provide adjustment means for adjusting the positions of the blades relative to the carriers. Such means may include first means for adjusting the positions of the blades toward and away from the wire, and including blade holders and threaded members rotatable on the carriers to displace the blade holders toward and away from the wire. Also, the blades may have sideward tongue and groove connections with the blade holders, and the carriers may have removable structure allowing quick access to the blades for removal from the holder.

An additional object is to provide lead means extending between the carriers for radially leading the carriers and blades relatively toward one another in response to pivoting of the arms; and such lead means may include pins extending between the two blade carriers and slidable in bores in the carriers.

Additionally, a microprocessor may be provided for operatively controlling the wire clamp means, the carriage first drive means, the rotating spindle, and the means to control the depth of cutting of the blade means.

Further, the invention enables use of the wire clamp means to serve the additional function of controllably displacing the wire or cable axially endwise, while the blades are prevented from axial movement endwise, whereby the blades may be precisely controlled and controlled in their movement toward and away from the wire, and also adjusted, if necessary, all for the purpose of obtaining more precise and accurate cutting and severing of wire sheathing to selected and controlled depth or depths, and removal of unwanted sheathing slugs. The blades are self-leading in their movement toward and away from the wire, and wire axial positioning is very simply achieved, using wide jaw or head clamp means.

These and other objects and advantages of the invention, as well as the details of an illustrative embodiment, will be more fully understood from the following specification and drawings, in which:

DRAWING DESCRIPTION

FIG. 1 is an overall perspective view of apparatus embodying the invention;

FIG. 2 shows a master control for the drives included in the FIG. 1 apparatus;

FIG. 3 is a schematic showing in 3(a)–3(d) of progressive V-blade cutting into wire sheathing;

Figure 7:
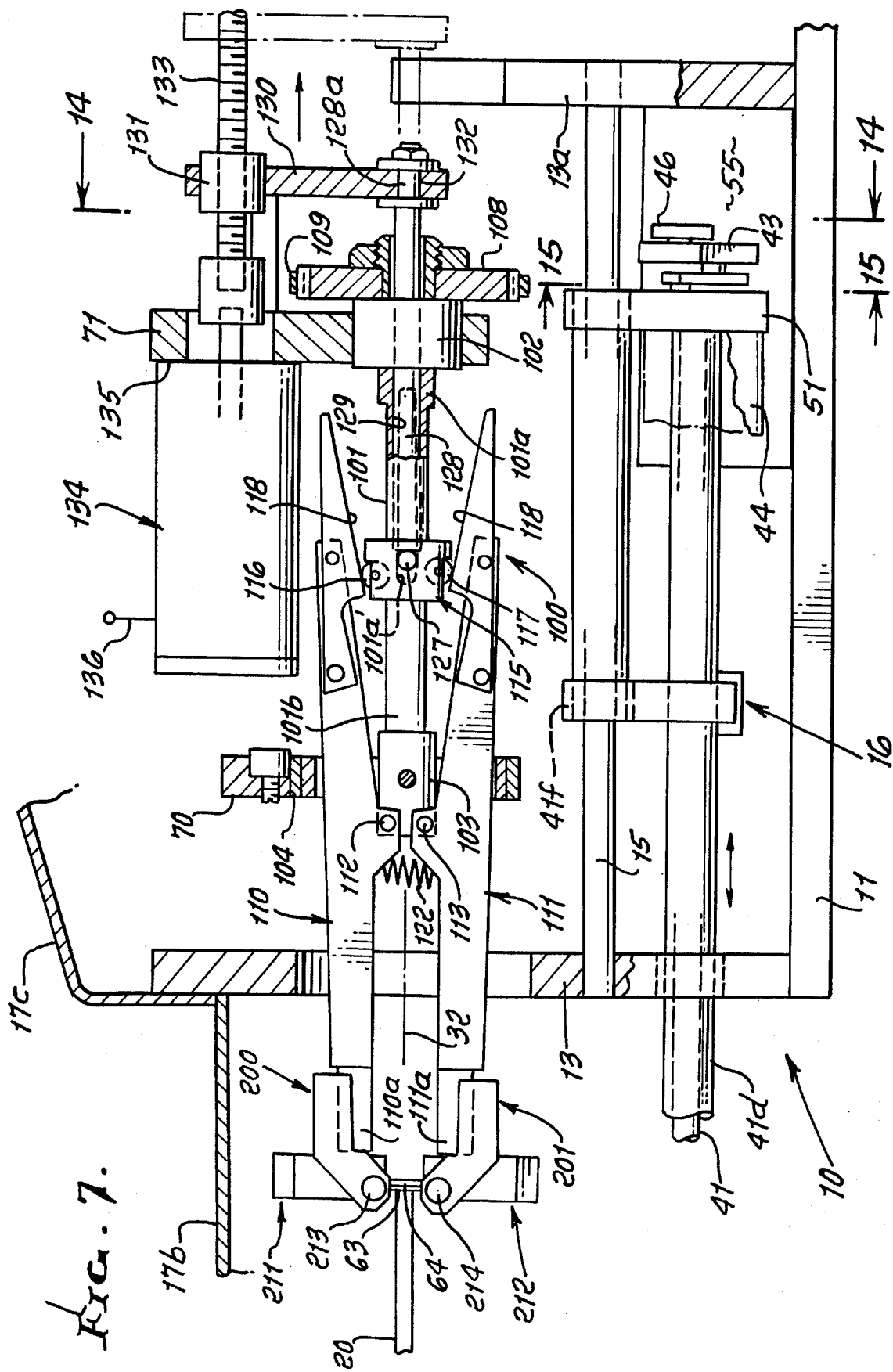
Figure 8:
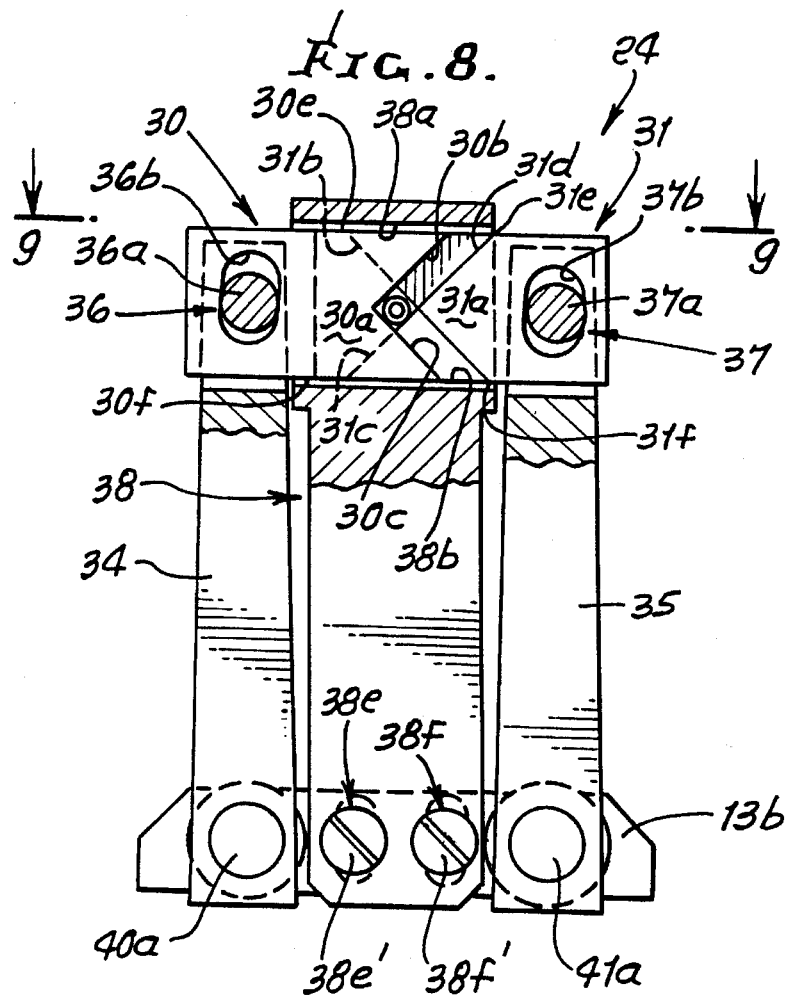
Figure 9:
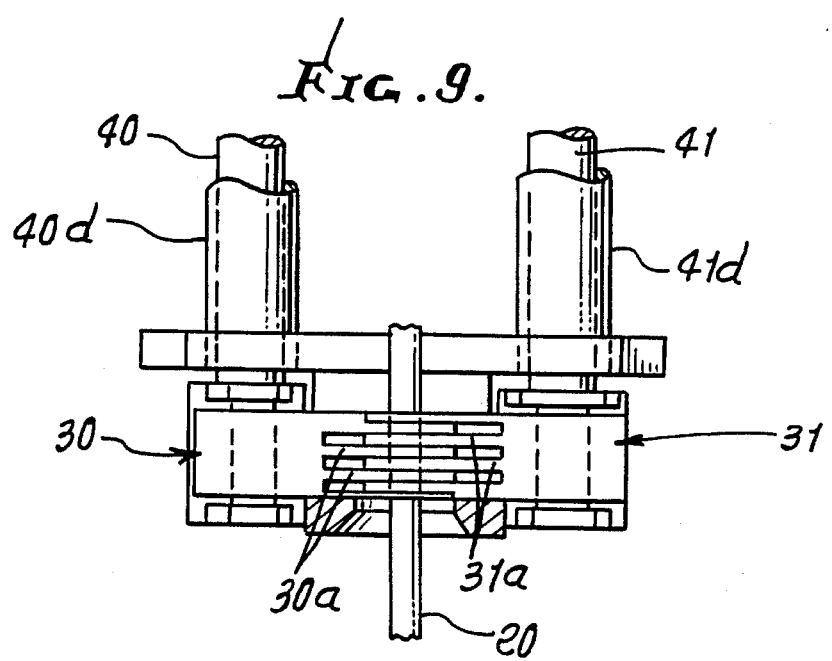
Figure 14:
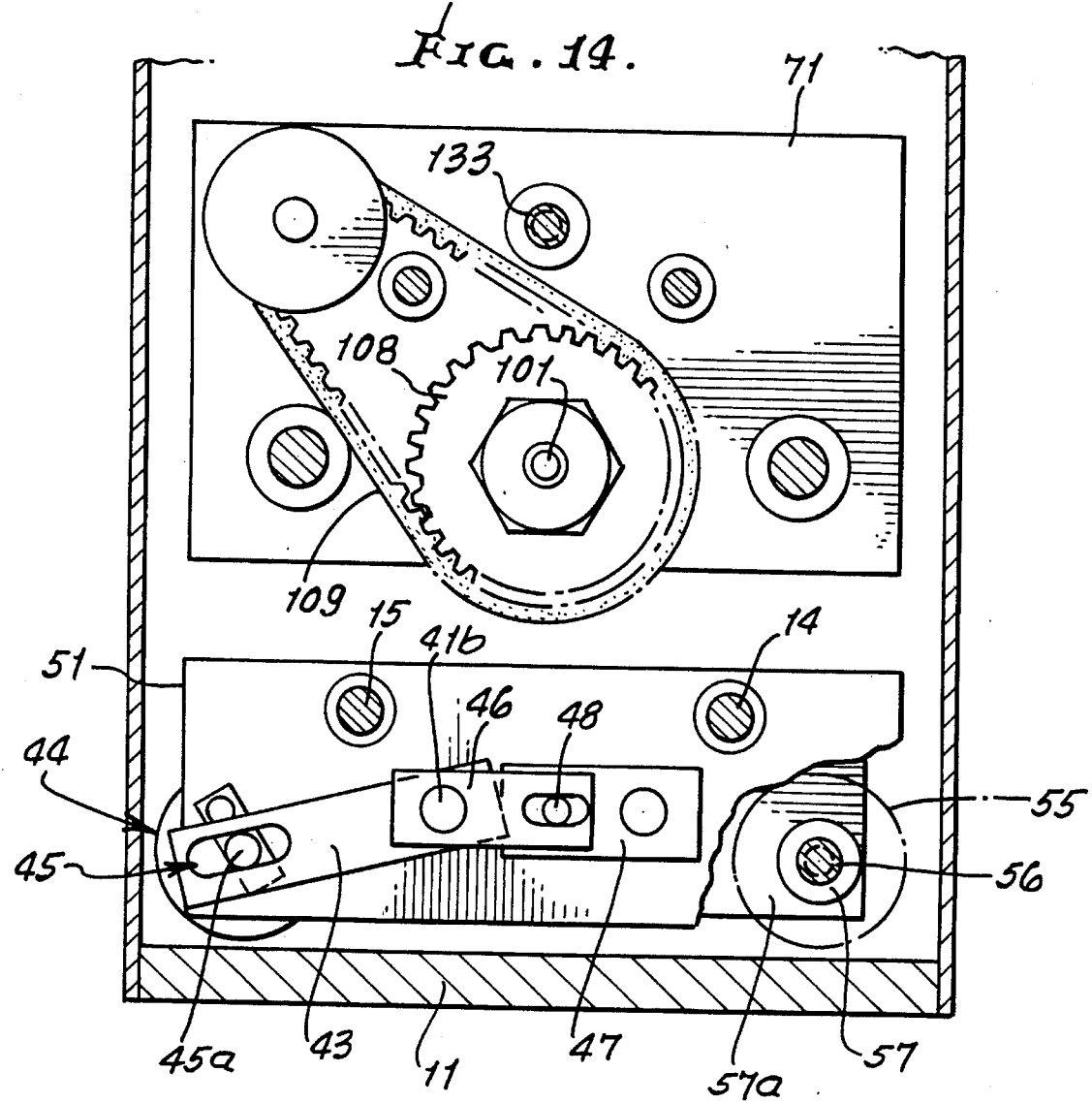
Figure 15:
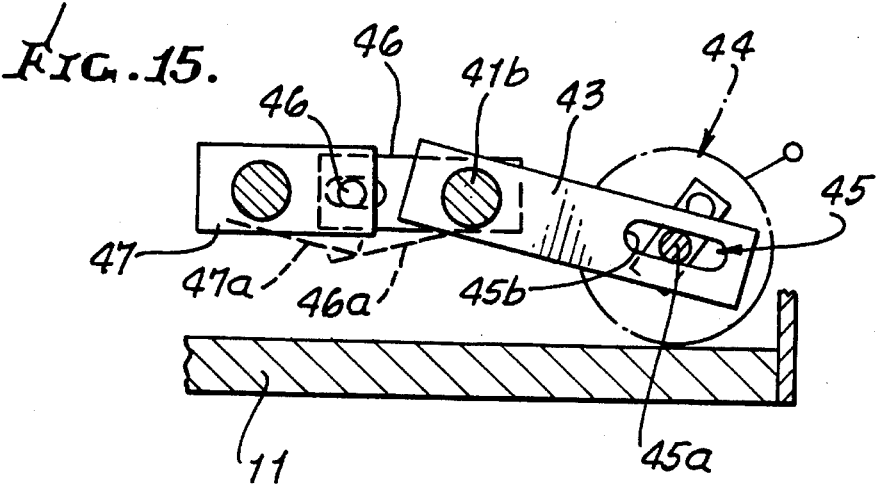

FIGS. 4(a)–4(g) are schematic views showing wire axial displacement by clamp means, and associated cutter blade advancement and retraction relative to wire sheathing;

FIG. 5 is a top plan view of apparatus embodying the invention;

FIG. 6 is a side elevation view of the FIG. 5 apparatus;

FIG. 7 is an enlarged fragmentary side elevation showing wire reception by the apparatus of FIGS. 5 and 6, the V-blades pivoted to closed positions;

FIG. 8 is an enlarged end view, partly in section, taken on lines 8—8 of FIG. 6, showing wire clamping;

FIG. 9 is a fragmentary top plan view on lines 9—9 of FIG. 8;

FIG. 10 is an enlarged end view taken on lines 10—10 of FIG. 6 and showing blade leading and blades in open position;

FIG. 11 is a bottom plan view taken on lines 11—11 of FIG. 10;

FIG. 12 is an enlarged side elevation taken in section on lines 12—12 of FIG. 10;

FIG. 13 is a view like FIG. 10 showing the blades in closed position;

FIG. 14 is a section taken on lines 14—14 of FIG. 7 showing clamp drive mechanism; and FIG. 15 is a section taken on lines 15—15 of FIG. 7 showing clamp drive mechanism.

DETAILED DESCRIPTION

In the drawings, and particularly as viewed in FIGS. 5 and 6, a frame 10 includes a horizontal base plate 11, and upright transverse plates 13 and 13a attached to the base. Guide rods 14 and 15 are fixed to plates 13 and 13a to extend longitudinally, for supporting carriage 16 to move longitudinally forwardly and rearwardly, as will be seen. Housing or shell 17, including sections 17a–17c, is carried by and extends over the frame and carriage. Microprocessor controls 18 are typically carried by the housing cover 17c, as seen in FIG. 1. These controls are associated with microprocessor master control indicated at 19 in FIG. 2.

The wire or cable to be processed, seen at 20 in FIGS. 1 and 7, is advanced endwise through an opening 21 in the end wall 22 of the housing section 17b, as for example to a position as seen in FIG. 7. See also FIG. 4a. The wire end 20a is thereby brought into engagement with closed blade or blades 63 and 64, at which time controls 18 are activated to cause the wire or cable to be sidewardly clamped by clamp means 24 on the frame, and at a clamping position spaced longitudinally endwise from the end 20a of the wire that has moved past the clamp means. See also the clamp means 24 in FIGS. 8 and 9. Note in FIGS. 3 and 8 the annular sheathing 20b about the wire metallic core 20c. The wire or cable may comprise a coaxial cable, for example.

One form of clamp means 24 may include two clamp elements, for example, in the form of heads 30 and 31 which are relatively movable toward one another to increasingly enclose and clamp the wire, while also centering it relative to a longitudinal axis 32, which is also the axis of rotation of a rotary spindle to be described. The two heads 30 and 31, which are shown, have parallel, intermeshing plates defining opposed, laterally facing V-shaped jaws which center and grip the wire or cable, as the clamp jaws close upon the wire or cable. Thus, as seen in FIGS. 8 and 9, the head 30 has parallel plates 30a with V-shaped jaw edges 30b and 30c, the plates being laterally separated; and head 31 has parallel plates 31a, with V-shaped jaw edges 31b and 31c, those plates also laterally separated and meshing with plates 30a. Angled stops on the heads, as at 31d on head 31 are engageable by edges 30b on the other head, and limit closing of the jaws, such as when no wire is between the jaws. Thus, clamping effect down to the smallest wire size is readily attainable.

The heads 30 and 31 are displaced laterally toward one another by two crank arms 34 and 35 on which the heads are respectively carried, as via lost motion connections 36 and 37 allowing relative pivoting of the heads and arms and also allowing linear laterally opposite displacement of the heads. Such linearity is achieved by a lateral lead 38 having parallel lateral lead shoulders 38a and 38b engageable with upper and lower lateral edges 30e and 30f, and 31e and 31f of the heads.

Connection 36 includes a pin 36a on the head 30 relatively movable in generally vertical slot 36b in the arm 34, as arm 34 rotates. See also pin 37a on the head 31 movable in generally vertical slot 37b in the arm 35, as arm 35 rotates. Note also vertical adjustability of lead 38, as by tongue and groove connections at 38e and 38f with the frame part 13b, and tightenable fasteners 38e' and 38f associated with the tongues. Thus, precise alignment of the V-shaped jaw apices with the wire axis is achieved, despite the lost motion connections; and inaccurate arc-travel of the V-shaped heads toward one another is avoided.

The drive also includes two longitudinal and parallel drive rods 40 and 41 carried by sleeves 40d and 41d attached to the carriage 16, to rotate relative thereto and in relatively opposite directions. Rod 40 is connected at end 40a with the lower end of crank arm 34; and rod 41 is connected at end 41a with the lower rod of crank arm 35, as seen in FIG. 8. Referring to FIG. 15, the opposite end 41b of rod 41 is connected with a crank arm 43 driven in rotation by a motor or gear motor 44, via a lost-motion tongue and groove connection seen at 45, the motor having an eccentric 45a on its output shaft that travels in the groove 45b of arm 43 to rotate that arm through a precisely controlled angle. Master control 19 has an output at 44a controlling the motor (forward and reverse).

Rod 41 is connected with rod 40 as via arms 46 and 47 rigidly connected with the rods, and a lost-motion tongue and groove connection 48 between those arms, whereby a precision degree of counterclockwise rotation of arm 46 and rod 40 imparts the same precision degree of clockwise rotation to arm 47 and rod 40. Note broken line rotated arm positions 46a and 47a, and see also FIG. 14. Clamping force is exerted by the motor and is limited or controlled by the extent of electrical energization of the motor, which is, in turn, controlled at 19, i.e., being selectable by means at 19.

Clamp carriage 16 is movable longitudinally left and right on the rods 14 and 15, and carries the clamp jaw drive 44, rods 40 and 41, and clamp means 24. Note carriage support plates 50 and 51 slidable on rods 14 and 15, and carrying 40, 41 and 44 in FIG. 6. The retracted position of 50 appears at 50a. Bearings for the rods appear at 41f. Carriage position motor 55 is carried by the base 10, and drives a screw 56 having threaded engagement with a nut 57 (see FIG. 5) which is rigidly attached to the carriage plate 57a, for moving the carriage 16 and the clamp means 24 longitudinally horizontally, for accurately moving the wire 20 longitudinally horizontally, to position the wire for cutting.

Motor 55 is connected at 59 to the master control 19, and a manual selector 18 at the master control enables precise selected and programmable positioning of the carriage 16, clamp means 24, and the clamped wire 20, via an encoder on the motor 55. The control may be digital or analog.

Blades 63 and 64 are carried by a rotating spindle assembly 100 having fixed longitudinal position relative to the base 10. The blade-supporting structure may, for example, be carried by fixed vertical plates 70 and 71, attached, for example, to fixed guides referred to above. See FIG. 7.

In the example, the spindle includes a horizontal shaft 101 defining spin axis 32, which is coaxial with the wire, as determined by the clamp means referred to above, no matter the size of the wire, due to the construction and operation of the clamp means. Shaft or axle 101 has one end 101a thereof supported by a bearing 102 in a plate 71; and the opposite end 101b of the shaft is supported by a hub 103 for rotation within a bearing 104 in plate 70. The shaft is rotated by a drive that includes a motor 105 (seen in FIGS. 6 and 14), supported by frame plate 71, a drive pulley 107 driven about a longitudinal axis by the motor, a driven pulley 108 on the spindle shaft 101, and a drive belt 109 entraining the pulleys. Motor 105 is operated via connection 105a to the master controller 19. The hub 103 pivotally mounts two longitudinally lengthwise extending arms 110 and 111, at pivot locations 112 and 113 on the hub. The means to controllably pivot the arms 110 and 111 will be described later. Blades or cutters 63 and 64 are carried at the ends 110a and 111a of those arms to be moved generally radially toward one another as the shaft 101, hub 103, and arms 110 and 111 rotate about axis 32.

Turning to FIGS. 7 and 10–13, support means is provided at the ends of the arms 110 and 111 to support the blades for generally radial movement, as referred to. See in this regard the two yoke units 200 and 201 attached at 200a and 201a to the ends of the arms 110 and 111, respectively. The yokes extend laterally and have pairs of legs 203 and 204, and 205 and 206, and lateral pivots 207 and 208, and 209 and 210 carried by the legs, as shown. The pivots support the upper and lower blade carriers 211 and 212, which are free to pivot about the lateral axes 213 and 214 defined by the lateral pivots. Pivot 207 also accomodates lateral adjustment shifting of the carriers 211 and 212 relative to the yokes, so that the blades 63 and 64 are exactly centered relative to the longitudinal travel path of the wire, as transported by the clamp means. See in this regard the pivot members 207a and 209a, which are pivotally attached to the carriers 211 and 212. Vernier shifting of shaft 209a is controlled by rotation of knob 311 on member 209a thread connected to 212.

Provision is also made for relative adjustment shifting of the blades generally radially, relative to the carriers. See in this regard the threaded members 220 and 221 carried by the carriers and having ends 220a and 221a rotated by an adjustment tool. See FIG. 12. As member 220 is rotated at head 220a' in one direction, it radially advances a holder 223 for blade 63 (with which it has threaded engagement at 220a) in a direction to move the blade 63 toward the wire relative to carrier 211; and as member 220 is rotated in the opposite direction, it radially retracts the holder 223 and blade 63 away from the wire. A spring 227 in a slot 228 in the carrier 211 urges the holder radially outwardly.

Similarly, as member 221, is rotated at head 221a' in one direction, it radially advances a holder 224 for blade 64 (with which it has threaded engagement at 221a) in a direction to move blade 64 toward the wire, relative to carrier 212; and as member 221 is rotated in the opposite direction, it radially retracts the holder 224 and blade 64 away from the wire, relative to carrier 212. Spring 229, in a slot 230, in carrier 212, urges the holder 224 radially outwardly. Lateral tongue and groove connections of the blades to the holders appear at 235 and 236, and are confined within the carriers 211 and 212. Upon disassembly of the carrier front plates 237 and 238, as by removal of fasteners 239 and 239', quick access is gained to the blades for removal off the holder tongue and groove connections, and quick replacement, without disturbing the blade holders, and other structure. This minimizes down time of the apparatus.

Accordingly, provision is made for precision adjustment of the blades, individually, relative to their carriers 211 and 212, and to one another, both laterally and radially, enhancing precision cutting of the wire sheathing, as in one or more radial steps, as programmed from the master control. Connection of the yokes to the arms are seen at 320 and 321.

Also provided is alignment means carried by the arms 110 and 111 for orienting the adjusted blades in precise alignment with one another, as during blade movement into cutting engagement with opposite sides of the wire. In this regard, the lead means may advantageously include leads, such as pins for example, for pivoting the blade carriers 211 and 212 relative toward one another in response to arm pivoting, in order to maintain the flat, planar blades in perpendicular relation to axis 32, as the blades are moved oppositely toward the axis. See in this regard the two pins 240 and 241 extending between the two carriers, and at opposite sides of the wire locus. Pin 240 may be carried at its upper end by the upper carrier 211 to extend downwardly and slide in a bore 240a in carrier 212; and pin 241 may be carried at its lower end by the lower carrier 212 to extend upwardly, and slide in a bore 241a in carrier 211. This assures that the blades remain in planes normal to the wire axis, as the arms 110 and 111 pivot, for enhanced accuracy of cutting position along the wire. Such accuracy would not be maintained if the blades and arms moved axially on a carriage, and relative to the wire.

Each of the blades preferably has a V-shaped cutting edge or edges, as at 63a and 63b, and 64a and 64b. Those edges define apices, as at 63c and 64c, maintained in precise alignment as the blades close toward one another, such alignment assured by the structure and adjustments described above. In this regard, the V-angles formed by the edges at $\alpha$ and $\beta$ are the same, and may be about 90°.

FIG. 3 shows successive stages in blade V-edge cutting into an inner layer of sheathing 20b, down to a circle or cylinder 20d defined by the interface between sheathing layers 20b and 20e. Such cutting typically occurs as the spindle assembly is rotated. No auxiliary wire guide means or its guiding function, is needed near the blades to facilitate the desired cutting, or severing, whereby simplicity is substantially enhanced, and risk of faulty guiding by such auxiliary guide means is eliminated.

Means is provided on the spindle to control the depth of cutting of the blades into the wire sheathing, as by control of movement of the blades, and their cutting edges 63a and 64a, toward one another, as the spindle rotates. Such means includes a cam, in the form of pusher 115 slidably mounted on the shaft 101 for axial movement relatively therealong, as via rollers 116 and 117 between the arm inclined surfaces 118 and the outer surface of the shaft 101. A compression spring 122 between the scissor-like arms yieldably urges the surfaces 118 into engagement with the rollers.

The pusher 115 is rotated by or with the shaft 101, as via a pin 127 extending radially through an axial slot 101a' in the shaft. That pin also serves to controllably displace the pusher endwise on the shaft, in response to endwise movement of rod 128 extending axially within a bore 129 in the shaft 101 and protruding at 128a. The left end of that rod is shown in FIG. 7, as connected to the pin 127, and the right end of the rod is connected by a support 130 with a nut 131. Support 130 does not rotate but allows rotation of rod 128 with the shaft 101, via bearing 132. Nut 131 is threaded on a threaded shaft 133 controllably rotated by a step or gear motor 134, the housing of which is mounted at 135 to the plate 71.

Accordingly, the motor controls the axial position of the pusher 115, and thereby precisely controls pivoting movement of the blades toward one another, and the depth of their cut into the cable or wire insulation, as the spindle rotates. Bearing 132 not only allows rotation of the rod 128 relative to the support 130, but also orients the link, axially. A connection 136 from the master control 19 to the motor 134 serves to control the extent of rotation of the motor and thereby the depth of penetration of the blades into the cable or wire sheath or insulation. For example, an encoder on the motor, encoded via control 19, controls the extent of motor rotor rotation (one revolution of the motor rotor may correspond to between 0.010 and 0.100 inch of blade travel).

Referring to FIGS. 4a–4g, the blades are initially closed toward one another to provide a barrier to endwise movement of the cable or wire. The wire is then inserted through opening 21 until its end 20a engages the closed blades, the axial position of which is selected by operation of clamp means drive motor 55 and master control 19. See FIG. 4a. At this time the clamp means 24 is in a predetermined position, endwise.

The master control is then activated to initiate its cycling. Motor 44 is activated to cause the clamp means 24 to clamp the wire. See FIG. 4b. Master controller 19 then operates motor 134 to cause the blades to open (retract); and controller 19 operates clamp carriage 16 to cause the carriage to move axially to a selected position, i.e., to displace the wire axially to bring the wire end 20a to a selected distance $d_1$ from the blades 63 and 64, and corresponding to the length $l_1$ of insulation or sheathing to be removed. The spindle is then rotated by motor 105. Blade closing motor 134 is then operated by the controller to cause the blades to move inwardly a controlled amount to sever a selected radial thickness of sheathing or insulation, as the spindle rotates. See FIG. 4c.

Motor 105 is then operated to stop the rotation of the spindle, and the carriage travel motor 55 is then operated to reverse to retract the clamp means and wire causing the closed blades to pull the severed insulation or sheathing 160 off the wire. See FIG. 4d. The clamp heads 30 and 31 are then opened by motor 44, releasing the wire or cable for pull-out in direction 161. The elements are then returned to FIG. 4a.

Figure 4A:
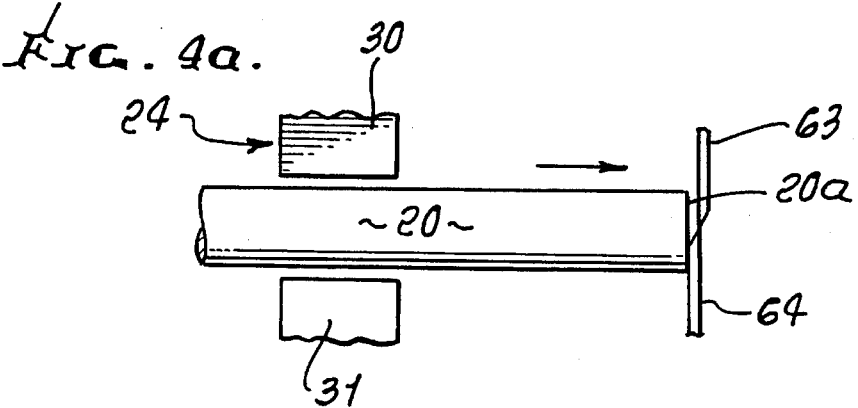
Figure 4B:
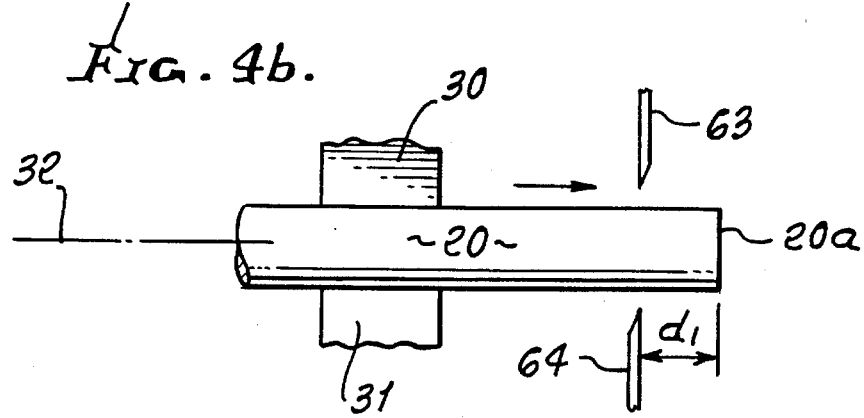
Figure 4C:
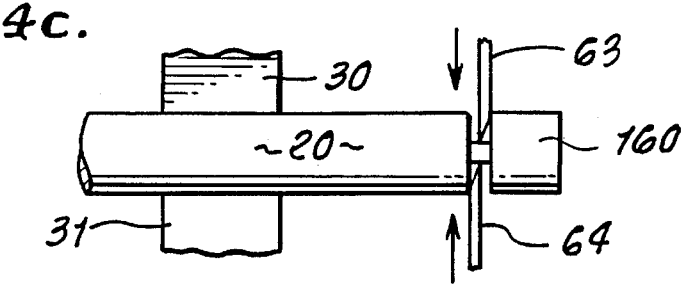
Figure 4D:
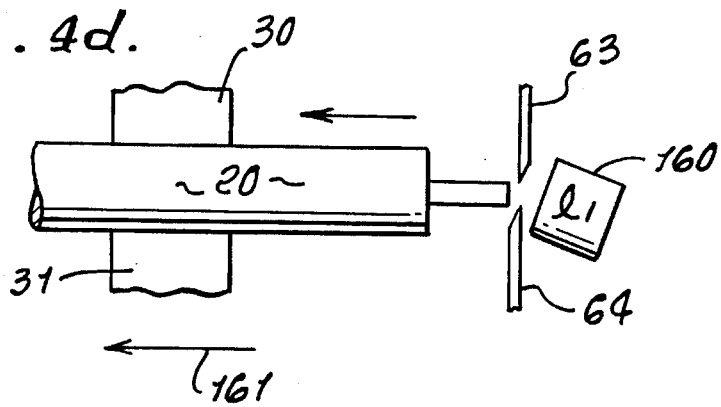
Figure 4E:
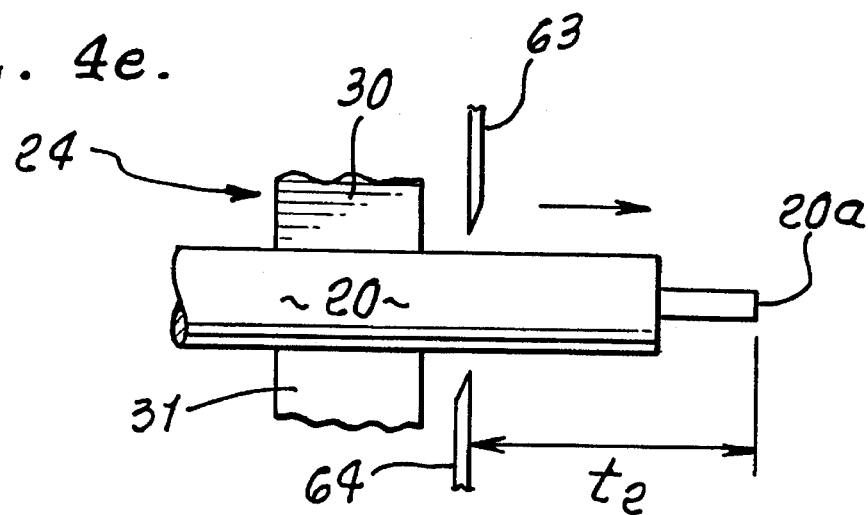
Figure 4F:
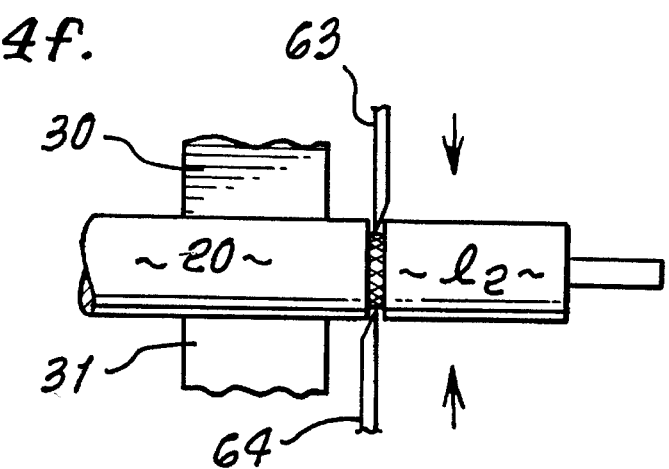
Figure 4G:
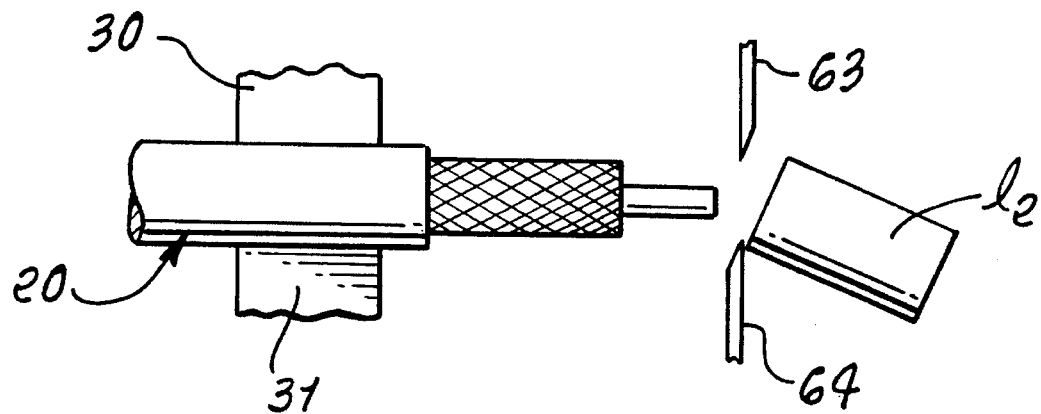

Alternatively, the cycling of the master controller 19 may operate motor 55 to cause the clamp means carriage 16 to move to a second selected (axial) position (as seen in FIG. 4e) to displace the wire axially and bring wire end 20a to a second selected distance $d_2$ from the blades 63 and 64, and for allowing a second length $l_2$ of insulation to be removed. The spindle is then again rotated by motor 105, and blade closing motor 134 operated by the controller to cause the blades to move radially inwardly a controlled amount to sever the second selected thickness and length of insulation or sheathing, as the spindle rotates. See FIG. 4f.

Motor 105 is then operated to stop rotation of the spindle, and carriage travel motor 55 operated in reverse to retract the clamp means 24 and heads 30 and 31, as well as the wire 20, to cause the closed blades to pull the severed insulation or sheathing length $l_2$ off the wire, and without requiring any axial displacement of the blades. Insulation 162 on the wire is thereby exposed. Thereafter, the clamp heads 30 and 31 are opened by motor, releasing the wire or cable for pull-out in direction 161 in FIG. 4g. Stepwise removal of different insulation thickness is thereby achieved.

Sequentially, motor 44 is operated first at $t_1$, near the beginning of the cycle, to effect clamping. Next, at $t_2$ motors 134 and 105 are operated, to open (retract) the blades and initiate spinning thereof. Motor 134 is turned off at $t_3$, the blades being open. At $t_4$, the clamp carriage motor 55 is turned on to position the wire, axially; and at $t_5$ the motor is turned off. At $t_6$, the blade motor 134 is operated reversely to move the spinning blades radially inwardly to commence cutting of the insulation, to selected depth. At $t_7$ and $t_8$, the motors 134 and 105 are operated; blade spin motor 105 is reversely operated to quickly brake the spinning of the blades; and motor 134 partially retracts the blades (note the provision of a short time interval between $t_8$ and $t_9$ during which motor 134 is reversed, and then turned OFF, with the blades partially retracted, so as to remain in position to pull insulation, i.e., sheathing, off the wire without scraping the wire extent not pulled off). At $t_{10}$, the clamp carriage motor 55 is operated to displace the carriage axially, pulling the wire axially to remove the cut slug of insulation off the wire. At $t_{11}$, the blade spin motor 105, operated in reverse since $t_8$, is turned off. Finally, the clamp motor 44 is operated reversely at $t_{12}$, and then turned off at $t_{13}$, freeing the wire for removal. In the above, controllably varying electric current is supplied to motor 134 to select torque level of such motor for enabling rotating blade cutting of wire insulation sections of different thicknesses. A limit switch 325 in FIG. 6 is engaged by the carriage support 51 in extreme right position of the carriage 16.

A keyboard 19', associated with the microprocessor, enables selection of depth of cut by the blades and wire end positioning (determined by carriage positioning) relative to a blade position.

In this way, insulation slugs of selected length and thickness can be removed off the wire in a very simple manner without requiring any blade axial movement, and enabling precision relative adjustment of the individual blades, both laterally and radially, as well as their quick removal and replacement.

I claim:

1. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) and first drive means operatively connected with the carriage to carry the wire to longitudinally selected positions at which the blade means then cuts into the sheathing to controlled depth, the carriage being retractable so that a cut plug of the sheathing is pulled endwise off the wire, g) said means to control the depth of cutting the blade means including pivoted arm means, an actuator for controllably pivoting the arm means, the blade means carried by the arm means, the arm means, spindle, and actuator carried by the frame, h) said blade means including two blades with V-shaped cutting edges, and said arm means including two arms pivoted to swing oppositely to carry the blades into cutting engagement with opposite sides of the wire, i) the spindle having a longitudinal axis of rotation, and including blade carriers for said two blades, carried by the respective arms, for movement toward and away from said axis, j) and wherein each of said blades has V-shaped cutting edges defining an apex, the apices of the two blades being in lateral alignment as the blades are moved oppositely toward the wire, k) and including blade aligners carried by the carriers to pivot and align the blades during movement thereof toward the wire.

2. The combination of claim 1 wherein said means to control the depth of cutting the blade means includes pivoted arm means, an actuator for controllably pivoting the arm means, the blade means carried by the arm means, the arm means, spindle, and actuator carried by the frame.

3. The combination of claim 2 wherein said blade means includes two blades with V-shaped cutting edges, and said arm means includes two arms pivoted to swing oppositely to carry the blades into cutting engagement with opposite sides of the wire.

4. The combination of claim 1 wherein the actuator extends between cam surfaces on said arms, for engaging said cam surfaces to controllably pivot said arms.

5. The combination of claim 1 wherein said clamp means includes two clamp elements, and including a drive operatively connected with said elements to move them relatively toward and away from one another.

6. The combination of claim 1 including second drive means on the frame and operatively connected with the spindle to rotate same, the spindle being rotatably mounted on the frame.

7. The combination of claim 1 wherein the spindle has a longitudinal axis of rotation, and including blade carriers for said two blades, carried by the respective arms, for movement toward and away from said axis.

8. The combination of claim 7 wherein each of said blades has V-shaped cutting edges defining an apex, the apices of the two blades being in lateral alignment as the blades are moved oppositely toward the wire.

9. The combination of claim 8 including blade aligners carried by the carriers to pivot and align the blades during movement thereof toward the wire.

10. The combination of claim 7 wherein said blade carriers have operative pivoted connection with said arms.

11. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) and first drive means operatively connected with the carriage to carry the wire to longitudinally selected positions at which the blade means then cuts into the sheathing to controlled depth, the carriage being retractable so that a cut plug of the sheathing is pulled endwise off the wire, g) said means to control the depth of cutting the blade means including pivoted arm means, an actuator for controllably pivoting the arm means, the blade means carried by the arm means, the arm means, spindle, and actuator carried by the frame, h) said blade means including two blades with V-shaped cutting edges, and said arm means including two arms pivoted to swing oppositely to carry the blades into cutting engagement with opposite sides of the wire, i) the spindle having a longitudinal axis of rotation, and including blade carriers for said two blades, carried by the respective arms, for movement toward and away from said axis, j) said blade carriers having operative pivoted connection to said arms, k) and including yokes on said arms, pivotally supporting said blade carriers.

12. The combination of claim 10 including adjustment means for adjusting the positions of the blades relative to said carriers.

13. The combination of claim 12 wherein said adjustment means includes first means for adjusting the positions of the blades toward and away from the wire, and including blade holders and threaded members rotatable on the carriers to displace the blade holders toward and away from the wire.

14. The combination of claim 13 wherein the blades have sideward tongue and groove connections with the blade holders, and the carriers have removable structure allowing quick access to the blades for removal from the holders.

15. The combination of claim 7 including lead means extending between the carriers for radially leading the carriers and blades relatively toward one another in response to pivoting of said arms, thereby to maintain the blades in predetermined angularity relative to the wire during arm pivoting.

16. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) and first drive means operatively connected with the carriage to carry the wire to longitudinally selected positions at which the blade means then cuts into the sheathing to controlled depth, the carriage being retractable so that a cut plug of the sheathing is pulled endwise off the wire, g) said means to control the depth of cutting the blade means including pivoted arm means, an actuator for controllably pivoting the arm means, the blade means carried by the arm means, the arm means, spindle, and actuator carried by the frame, h) said blade means including two blades with V-shaped cutting edges, and said arm means including two arms pivoted to swing oppositely to carry the blades into cutting engagement with opposite sides of the wire, i) the spindle having a longitudinal axis of rotation, and including blade carriers for said two blades, carried by the respective arms, for movement toward and away from said axis, j) there being lead means extending between the carriers for radially leading the carriers and blades relatively toward one another in response to pivoting of said arms, thereby to maintain the blades in predetermined angularity relative to the wire during arm pivoting, k) and wherein the lead means includes pin means, and bore means in at least one carrier to slidably receive the pin means thereby to maintain the blades in planes normal to the wire as the blades are moved toward one another.

17. The combination of claim 1 including a microprocessor for operatively controlling said wire clamp means, said carriage first drive means, said rotating spindle, and said means to control the depth of cutting of the blade means.

18. The combination of claim 17 wherein said clamp means includes two clamp elements, and a clamp drive controlled by the microprocessor and operatively connected with said elements to move them relatively toward and away from each other.

19. The combination of claim 18 wherein said elements comprise two heads with V-shaped jaws movable relatively toward one another to increasingly enclose and center the wire along an axis toward which the blade means are movable.

20. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) first drive means operatively connected with the carriage to carry the wire to longitudinally selected positions at which the blade means then cuts into the sheathing to controlled depth, the carriage being retractable so that a cut plug of the sheathing is pulled endwise off the wire, g) and control means for operatively controlling said wire clamp means, said carriage first drive means, said rotating spindle, and said means to control the depth of cutting of the blade means, h) there being aligner means for said blade means and carried by said carrier, i) said means to control the depth of cutting of the blade means including pivoted arm means, an actuator for controllably pivoting the arm means, the blade means carried by the arm means, the arm means, spindle, and actuator carried by the frame, j) said blade means including two blades with V-shaped cutting edges, and said arm means including two arms pivoted to swing oppositely to carry the blades into cutting engagement with opposite sides of the wire, k) the spindle having a longitudinal axis of rotation, and including blade carriers for said two blades, carried by the respective arms, for movement toward and away from said axis, l) said V-shaped cutting edges defining apices which are in lateral alignment as the blades are moved oppositely toward the wire, m) said aligner means including blade aligners carried by the carriers to pivot and align the blades during movement thereof toward the wire.

21. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) first drive means operatively connected with the carriage to carry the wire to longitudinally selected positions at which the blade means then cuts into the sheathing to controlled depth, the carriage being retractable so that a cut plug of the sheathing is pulled endwise off the wire, g) and control means for operatively controlling said wire clamp means, said carriage first drive means, said rotating spindle, and said means to control the depth of cutting of the blade means, h) said means to control the depth of cutting the blade means including pivoted arm means, an actuator for controllably pivoting the arm means, the blade means carried by the arm means, the arm means, spindle, and actuator carried by the frame, i) said blade means including two blades with V-shaped cutting edges, and said arm means includes two arms pivoted to swing oppositely to carry the blades into cutting engagement with opposite sides of the wire, j) said spindle having a longitudinal axis of rotation, and including blade carriers for said two blades, carried by the respective arms, for movement toward and away from said axis, k) said blade carriers having operative pivoted connection with said arms, l) and including yokes on said arms, pivotally supporting said blade carriers.

22. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) first drive means operatively connected with the carriage to carry the wire to longitudinally selected positions at which the blade means then cuts into the sheathing to controlled depth, the carriage being retractable so that a cut plug of the sheathing is pulled endwise off the wire, g) and control means for operatively controlling said wire clamp means, said carriage first drive means, said rotating spindle, and said means to control the depth of cutting of the blade means, h) said means to control the depth of cutting the blade means including pivoted arm means, an actuator for controllably pivoting the arm means, the blade means carried by the arm means, the arm means, spindle, and actuator carried by the frame, i) said blade means including two blades with V-shaped cutting edges, and said arm means includes two arms pivoted to swing oppositely to carry the blades into cutting engagement with opposite sides of the wire, j) said spindle having a longitudinal axis of rotation, and including blade carriers for said two blades, carried by the respective arms, for movement toward and away from said axis, k) said blade carriers having operative pivoted connection with said arms, there being adjustment means for adjusting the positions of the blades relative to said carriers, l) and wherein said adjustment means includes first means for adjusting the positions of the blades toward and away from the wire, and including blade holders and threaded members rotatable on the carriers to displace the blade holders toward and away from the wire.

23. The combination of claim 22 wherein the blades have sideward tongue and groove connections with the blade holders, and the carriers have removable structure allowing quick access to the blades for removal from the holders.

24. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) first drive means operatively connected with the carriage to carry the wire to longitudinally selected positions at which the blade means then cuts into the sheathing to controlled depth, the carriage being retractable so that a cut plug of the sheathing is pulled endwise off the wire, g) and control means for operatively controlling said wire clamp means, said carriage first drive means, said rotating spindle, and said means to control the depth of cutting of the blade means, h) said means to control the depth of cutting the blade means including pivoted arm means, an actuator for controllably pivoting the arm means, the blade means carried by the arm means, the arm means, spindle, and actuator carried by the frame, i) said blade means including two blades with V-shaped cutting edges, and said arm means includes two arms pivoted to swing oppositely to carry the blades into cutting engagement with opposite sides of the wire, j) said spindle having a longitudinal axis of rotation, and including blade carriers for said two blades, carried by the respective arms, for movement toward and away from said axis, k) and including lead means extending between the carriers for radially leading the carriers and blades relatively toward one another in response to pivoting of said arms, thereby to maintain the blades in predetermined angularity relative to the wire during arm pivoting, l) and wherein the lead means includes pin means, and bore means in at least one carrier to slidably receive the pin means thereby to maintain the blades in planes normal to the wire as the blades are moved toward one another.

25. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) and first drive means operatively connected with the carriage to carry the wire to longitudinally selected positions at which the blade means then cuts into the sheathing to controlled depth, the carriage being retractable so that a cut plug of the sheathing is pulled endwise off the wire, g) the spindle having a longitudinal axis of rotation, and including blade carrier means for said blade means, carried for movement toward and away from said axis, h) and including blade aligner means carried by the carrier means to pivot and align the blade means during movement thereof toward the wire.

26. In apparatus for stripping sheathing from longitudinally axially extending wire at controllable depth, the combination comprising:

a) a frame, b) a carriage on the frame linearly movable longitudinally, c) wire clamp means on the carriage for sidewardly clamping the wire sheathing, at a location spaced from the end of the wire advanced past the clamp means, the clamp means movable longitudinally by the carriage, d) a rotating spindle on the frame and blade means on the spindle and rotatable thereby to rotatably cut into the wire sheathing, the blade means having cutting edges, e) means to control the depth of cutting of the blade means into the sheathing, and as the spindle rotates, f) and first drive means operatively connected with the carriage to carry the wire to longitudinally selected positions at which the blade means then cuts into the sheathing to controlled depth, the carriage being retractable so that a cut plug of the sheathing is pulled endwise off the wire, g) the spindle having a longitudinal axis of rotation, and including blade carriers for two blades of said blade means, carried for movement toward and away from said axis, there being arms to carry the blades, h) there being lead means extending between the carriers for radially leading the carriers and blades relatively toward one another in response to pivoting of said arms, thereby to maintain the blades in predetermined angularity relative to the wire during arm pivoting, i) said lead means including pin means, and bore means in at least one carrier to slidably receive the pin means thereby to maintain the blades in planes normal to the wire as the blades are moved toward one another.

* * * * *